(12) United States Patent
Ehlers et al.

(10) Patent No.: US 10,214,290 B2
(45) Date of Patent: Feb. 26, 2019

(54) EXPANDABLE GALLEY

(71) Applicant: Airbus Operations GmbH, Hamburg (DE)

(72) Inventors: Bernd Ehlers, Hamburg (DE); Mark Herzog, Hamburg (DE); Stefan Behrens, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 104 days.

(21) Appl. No.: 14/475,735

(22) Filed: Sep. 3, 2014

(65) Prior Publication Data

US 2015/0069179 A1 Mar. 12, 2015

(30) Foreign Application Priority Data

Sep. 11, 2013 (EP) ..................................... 13183945

(51) Int. Cl.
*B64D 11/04* (2006.01)
*B64D 11/00* (2006.01)

(52) U.S. Cl.
CPC ............ *B64D 11/04* (2013.01); *B64D 11/003* (2013.01); *B64D 2011/0046* (2013.01)

(58) Field of Classification Search
CPC .................. B67D 11/04; B67D 11/003; B67D 2011/0046; B67D 2011/0069–2011/0092
USPC ...................................................... 244/118.5
See application file for complete search history.

(56) References Cited

U.S. PATENT DOCUMENTS

| | | | | |
|---|---|---|---|---|
| 6,007,025 A * | 12/1999 | Coughren | | B64D 11/02 244/118.5 |
| 6,615,421 B2 * | 9/2003 | Itakura | | B64D 11/02 244/118.5 |
| 7,780,114 B2 | 8/2010 | Doebertin et al. | | |
| 7,980,511 B2 * | 7/2011 | Janboecke | | A61G 3/00 244/118.5 |
| 8,662,444 B2 * | 3/2014 | Tappe | | B64D 11/02 244/118.5 |
| 9,120,573 B2 * | 9/2015 | Ehlers | | B64D 11/0007 |
| 9,637,236 B2 * | 5/2017 | Vandewall | | B64D 11/04 |
| 2005/0133330 A1 | 6/2005 | Reysa et al. | | |
| 2008/0001031 A1 | 1/2008 | Doebertin et al. | | |
| 2010/0308190 A1 * | 12/2010 | Tkocz | | B64D 11/04 248/222.14 |
| 2012/0032026 A1 * | 2/2012 | Becker | | B64D 11/0023 244/118.5 |

(Continued)

FOREIGN PATENT DOCUMENTS

DE 102006023047 1/2010

OTHER PUBLICATIONS

European Search Report, dated Feb. 13, 2014.

*Primary Examiner* — Marc Burgess
(74) *Attorney, Agent, or Firm* — Greer, Burns & Crain, Ltd.

(57) ABSTRACT

An aircraft galley including a trolley stowage provided in a main body of the aircraft galley. A wall of the main body includes a first section delimiting the trolley stowage and a second section. The trolley stowage is convertible between a first operational state, wherein the trolley stowage is adapted to accommodate a first number of trolleys, and a second operational state, wherein the trolley stowage is adapted to accommodate a second number of trolleys. The second number of trolleys is greater than the first number of trolleys.

14 Claims, 9 Drawing Sheets

(56) References Cited

U.S. PATENT DOCUMENTS

| | | | |
|---|---|---|---|
| 2013/0206904 A1 | 5/2013 | Gee et al. | |
| 2013/0206906 A1* | 8/2013 | Burrows | B64D 11/0691 244/118.5 |
| 2014/0054416 A1* | 2/2014 | Lee | B64D 47/00 244/118.1 |
| 2014/0339364 A1* | 11/2014 | Ehlers | B64D 11/00 244/118.6 |
| 2015/0069891 A1* | 3/2015 | Schimanowski | B64D 11/04 312/242 |
| 2016/0101866 A1* | 4/2016 | Sieben | B64C 1/1423 244/118.5 |
| 2018/0072425 A1* | 3/2018 | Weifenbach | B64D 11/0007 |

* cited by examiner

EXPANDABLE GALLEY

CROSS-REFERENCES TO RELATED APPLICATIONS

This application claims the benefit of the European patent application No. 13183945.8 filed on Sep. 11, 2013, the entire disclosures of which are incorporated herein by way of reference.

BACKGROUND OF THE INVENTION

The invention relates to an aircraft galley comprising a trolley stowage. The invention further relates to a method of operating an aircraft galley of this kind.

The passenger cabin of a modern aircraft typically is equipped with a plurality of galleys which are located next to aircraft doors and adjacent to a passageway as well as an aisle in an entrance area of the aircraft. A galley which is described in DE 10 2006 023 047 B4 or U.S. Pat. No. 7,780,114 B2 comprises a main body being separated into a plurality of compartments which are suitable for receiving galley inserts such as, e.g., coffee makers, ovens and the like, as well as compartments which are suitable for accommodating so-called standard units which may be loaded with items to be supplied to passengers on board the aircraft or items required by a cabin crew during the flight. Further, the galley comprises a trolley stowage, i.e., a compartment which is arranged in a section of the galley adjacent to a floor of the aircraft cabin and which is suitable to accommodate a predetermined number of trolleys. The galley layout, i.e., the size and the number of the various compartments is adapted to the cabin layout, i.e., to the maximum number of passengers on board the aircraft, and the space requirements for the passageway and the aisle extending adjacent to the galley.

In the operation of modern passenger aircraft, cabin layout flexibility becomes more and more important, since it may be economically worthwhile for an airline to operate the aircraft at certain times, e.g., during the holiday period, with a greater number of economy class seats and at other times, e.g., outside the holiday period, with a greater number of business class seats. Moreover, it may be desirable for an airline to vary the total number of seats in the aircraft passenger cabin depending on the utilization or route, for example. An optimization of the aircraft utilization therefore requires not only a positioning of the passenger seats and a division of the aircraft passenger cabin into a business class area and an economy class area as flexibly as possible, but also an adjustment of the galley capacity to the varying number of passengers on board the aircraft.

SUMMARY OF THE INVENTION

The invention is directed at the object of providing an aircraft galley which allows an easy adjustment of the galley capacity to a varying number of passengers on board the aircraft. The invention further is directed at the object of providing a method of operating an aircraft galley of this kind.

An aircraft galley according to the invention comprises a trolley stowage which is provided in a main body of the aircraft galley. The main body of the aircraft galley may be formed of a plurality of panels, which may, e.g., have a sandwich structure and which may be firmly attached to each other so as to define the overall structure of the aircraft galley. Beside the trolley stowage, the main body of the aircraft galley may comprise a plurality of compartments which may be suitable for receiving galley inserts such as, e.g., coffeemakers, ovens and the like, or which are suitable for accommodating so-called standard units which may be loaded with items to be supplied to passengers on board the aircraft or items required by a cabin crew during the flight. Preferably, the trolley stowage is arranged in a lower portion of the main body, i.e., a portion of the main body which is adjacent to floor of an aircraft cabin when the aircraft galley is mounted in an aircraft cabin. This allows trolleys to be simply pushed into the trolley stowage. The aircraft galley may further be provided with a securing mechanism which allows securing trolleys accommodated in the trolley stowage in place.

A wall of the main body comprises a first section delimiting the trolley stowage and a second section. The wall of the main body may be a back wall of the main body. The first section of the wall then forms a rear boundary of the trolley stowage. The first section of the wall which delimits the trolley stowage preferably forms a lower section of the wall, i.e., a section of the wall which is disposed adjacent to the cabin floor when the aircraft galley is mounted in an aircraft cabin. The second section of the wall may form an upper section of the wall. The second section of the wall, however, may also comprise a portion which extends laterally with respect to the first section, i.e., a portion which extends adjacent to a side panel of the main body of the aircraft galley.

The trolley stowage is convertible between a first operational state and a second operational state. In its first operational state, the trolley stowage is adapted to accommodate a first number of trolleys. In its second operational state, the trolley is adapted to accommodate a second number of trolleys. The second number of trolleys is greater than the first number of trolleys. Hence, the aircraft galley comprises an expandable trolley stowage which, in its second operational state, provides more space for the accommodation of trolleys than in its first operational state. The additional trolleys which, in the second operational state of the trolley stowage, can be accommodated within the aircraft galley may be loaded with additional items to be supplied to passengers on board the aircraft. As a result, the layout of the aircraft galley can be adjusted on demand to the number of seats provided in the aircraft cabin and hence the numbers of passengers on board the aircraft. The aircraft galley thus allows a particularly easy adjustment of the galley capacity to the needs of varying numbers of passengers on board the aircraft.

The first section of the wall, in the first operational state of the trolley stowage, preferably extends coplanar to the second section of the wall. In other words, when the trolley stowage is in its first operational state, the first and the second section of the wall preferably extend in the same plane and thus commonly define a continuous wall surface of, e.g., the back wall of the main body of the aircraft galley. While the trolley stowage, in its first operational state, on a rear side may be delimited by the first section of the wall, lateral boundaries of the trolley stowage may be defined by side panels of the main body and/or compartment separation panels extending in particular substantially parallel to the side panels of the main body within the main body of the aircraft galley.

In the second operational state of the trolley stowage, the first section of the wall may extend in a plane which is arranged at a distance from the second section of the wall. Specifically, the first section of the wall, in the second operational state of the trolley stowage, may extend substantially parallel to the second section of the wall. Hence, in the second operational state of trolley stowage, the first section of the wall still may define a rear boundary of the trolley stowage, wherein the distance between the first and the second section of the wall may determine an additional volume of the trolley stowage in its second operational state. In the second operational state of the trolley stowage, the trolley stowage thus may comprise a volume portion which is still arranged entirely within the main body of the aircraft galley, whereas the additional volume of the trolley stowage in its second operational state may be arranged outside of the main body and merely delimited at a rear end side by the first section of the wall extending offset relative to the second section of the wall.

A top wall may be connected to the first section of the wall. In the first operational state of the trolley stowage, the top wall may be accommodated within the main body. Specifically, in the first operational state of the trolley stowage, the top wall may be arranged within the main body of the aircraft galley below and substantially parallel to a separation panel extending within the main body and providing for an upper limitation of the trolley stowage as long as the trolley stowage is its first operational state. To the contrary, in the second operational state of the trolley stowage, the top wall may provide for a partial upper limitation of the trolley stowage. In particular, the top wall may serve as an upper limitation, i.e., a cover plate for the additional volume of the trolley stowage in its second operational state, whereas the volume portion of the trolley stowage which is arranged entirely within the main body of the aircraft galley still may be covered by the separation panel which in the first operational state of the trolley stowage provides for an upper limitation of the trolley stowage. The top wall thus, in the second operational state of the trolley stowage, covers and hence protects the trolleys accommodated in the additional volume of the trolley stowage in its second operational state.

The top wall, at least in the second operational state of the trolley stowage, may extend substantially perpendicular to at least one of the first and the second section of the wall. When the trolley stowage is in its second operational state, the top wall then may be used for different stowage options, e.g., as a coat rack or a magazine rack, or as an additional working surface for the cabin crew. In general, the top wall may be fixedly attached to the first section of the wall. In this arrangement the top wall may extend substantially perpendicular to at least one of the first and the second section of the wall, also in the first operational state of the trolley stowage. It is, however, also conceivable to pivotably connect the top wall to the first section of the wall. The top wall then, in the first operational state of the trolley stowage, may extend adjacent and parallel to the first portion of the wall.

At least one sidewall may be connected to the first section of the wall. In the first operational state of the trolley stowage, the at least one sidewall may be accommodated within the main body. In the second operational state of the trolley stowage, the at least one sidewall may provide for a lateral limitation of the additional volume of the trolley stowage. In a preferred embodiment of the aircraft galley, two sidewalls are connected to the first section of the wall which, in the first operational state of the trolley stowage, are accommodated within the main body and which, in the second operational state of the trolley stowage, provide for a lateral limitation of the additional volume of the trolley stowage. In case two sidewalls are connected to the first section of the wall, both sidewalls may be constructed as described below.

The at least one sidewall, at least in the second operational state of the trolley stowage, may extend substantially perpendicular to at least one of the first section of the wall and the top wall. The at least one sidewall, together with the first section of the wall and preferably also the top wall then defines a cuboid-shaped additional volume of the trolley stowage space which is in particular suitable for accommodating trolleys. Alternatively or additionally thereto, the at least one sidewall may extend substantially parallel to and in particular coplanar to a side panel of the main body. A side wall extending only parallel to a side panel of the main body may allow a particularly efficient utilization of the available space within an aircraft cabin. A sidewall extending coplanar to a side panel of the main body, together with the side panel of the main body, may define a continuous lateral boundary of the aircraft galley which has a pleasing visual appearance.

The sidewall may be pivotably connected to the first section of the wall, such that the sidewall, in the first operational state of the trolley stowage, is adapted to be accommodated within the main body adjacent and parallel to the first section of the wall. The sidewall, in the first operational state of the trolley stowage, then provides for a reinforcement of the first section of the wall and simultaneously does not restrict the dimensions of the trolley stowage in a lateral direction, i.e., a direction parallel to the first section of the wall.

Alternatively of additionally thereto, the sidewall may comprise a first portion and second portion which is pivotably connected to the first portion, such that the second portion of the sidewall, in the first operational state of the trolley stowage, is adapted to the accommodated within the main body adjacent and parallel to the first portion of the sidewall. In case the sidewall is pivotably connected to the first section of the wall and comprises pivotably connected first and second portions, the sidewall, in the first operational state of the trolley stowage, may be accommodated within the main body in a position wherein the first and the second portion of the sidewall extend adjacent and parallel to each other and adjacent and parallel to the first section of the wall. In the second operational state of the trolley stowage, the sidewall portions may be arranged in a pivoted state, i.e., parallel and adjacent to each other so as to provide for a lateral limitation of a small additional volume of the trolley stowage. In the second operational state of the trolley stowage, the sidewall portions may, however, also be arranged coplanar and side-by-side to each other so as to define an enlarged lateral limitation of a larger additional volume of the trolley stowage.

The aircraft galley may further comprise a latching mechanism which is adapted to latch the trolley stowage in either the first or the second operational state. A secure and reliable accommodation of trolley thus can be ensured independent of whether the trolley stowage is in the first or the second operational state. Basically, a first latching mechanism may be provided which is adapted to latch the trolley stowage in the first operational state and a second latching mechanism may be provided which is adapted to latch the trolley stowage in the second operational state. Preferably, however, the same latching mechanism is adapted to latch the trolley stowage on demand in either the first or the second operational state.

Preferably, the latching mechanism comprises at least one latching element which is adapted to interact with a seat rail. The seat rail may be provided in a cabin floor of an aircraft cabin wherein the aircraft galley may be mounted. The latching mechanism thus makes use of an already existing fixation mechanism. Further, the latching element may interact with the seat rail at different positions, allowing the first section of the wall to be attached to the cabin floor in different positions. As a result, the trolley stowage, in a particularly flexible manner, may be converted between a first operational state and a second operational state, wherein the trolley stowage in its second operational state may have different stowage volumes. In a preferred embodiment of the aircraft galley, the latching element is arranged in the region of an edge of the first section of the wall, the edge facing the floor of an aircraft cabin when the aircraft galley is mounted in the aircraft cabin.

The aircraft galley may further comprise a handle which is arranged on an outer surface of the first section of the wall. The term "outer surface" in this context should designate a surface of the first section of the wall which faces away from an interior of the main body. The handle may be gripped by a user upon applying a pulling force to the first section of the wall so as to displace the first section of the wall until the trolley stowage is in its second operational state as will be described below.

In a first embodiment of a method of operating an above described aircraft galley, the trolley stowage is converted from its first operational state into its second operational state by pushing a trolley into the trolley stowage until the trolley abuts against an inner surface of the first section of the wall and by further pushing the trolley against the inner surface of first section of the wall so as to displace the first section of the wall until the trolley stowage is in its second operational state. The term "inner surface" in this context should designate a surface of the first section of the wall which faces towards an interior of the main body. The trolley stowage thus may be expanded by simply pushing a trolley into the trolley stowage against the inner surface of first section of the wall and by displacing the first section of the wall by means of the trolley.

In an alternative method of operating an aircraft galley as described above, the trolley stowage is converted from its first operational state into its second operational state by the application of a pulling force to the outer surface of the first section of the wall so as to displace the first section of the wall until the trolley stowage is in its second operational state. A user may grip the handle arranged on the outer surface of first section of the wall and displace the first section of the wall as far as needed.

A combination of the above alternative methods of operating an aircraft galley is conceivable. For example, the aircraft galley may be constructed so as to allow the trolley stowage to be converted from its first operational state into its second operational state by the interaction of a trolley with the inner surface of the first section of the wall and by the application of a manual pulling force to the outer surface of the first section of the wall. Further, the trolley stowage may be converted from its second operational state back into its first operational state by the application of a pushing force to the outer surface of the first section of the wall. This pushing force may be applied manually.

In case the aircraft galley comprises a latching mechanism which is adapted to latch the trolley stowage in either the first or the second operational state, the latching mechanism preferably is unlatched prior to converting the trolley stowage from its first operational state into its second operational state. The latching mechanism may be again latched, when the trolley stowage is in its second operational state. Of course, the latching mechanism also may be unlatched prior to converting the trolley stowage from its second operational state into its first operational state, and latched again as soon as the trolley stowage is in its first operational state.

In case the aircraft galley is provided with a sidewall which is pivotably attached to the first section of the wall and/or which comprises pivotably connected portions, the sidewall and/or the sidewall portions preferably is/are pivoted in place so as to form a lateral limitation of the additional volume of the trolley stowage after the first section of the wall has been displaced to a desired location upon converting the trolley stowage from its first operational state into its second operational state.

BRIEF DESCRIPTION OF THE DRAWINGS

Preferred embodiments of the invention are now described in greater detail with reference to the appended schematic drawings, wherein.

DETAILED DESCRIPTION OF THE PREFERRED EMBODIMENTS

An aircraft galley 10 as depicted in FIGS. 1 to 4 comprises a main body 12 which is defined by a plurality of sandwich structure panels. A trolley stowage 14 is provided in the main body 12. Specifically, the trolley stowage 14 is arranged in a lower portion of the main body 12, i.e., a portion of the main body 12 adjacent to a floor 16 of an aircraft cabin. Hence, as becomes apparent from FIG. 2, trolleys 18 loaded with items to be supplied to passengers on board the aircraft may comfortably be accommodated within the trolley stowage 14 by simply pushing the trolleys 18 into the trolley stowage 14.

Figure 1:
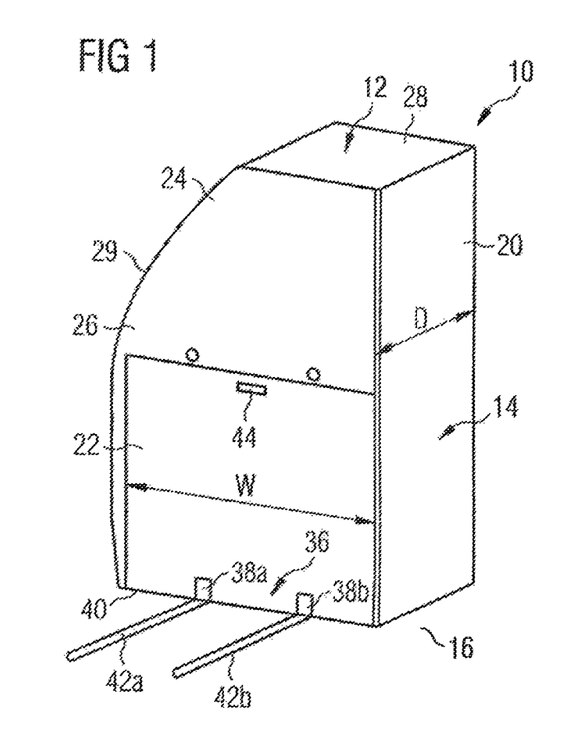
FIG. 1 shows a three dimensional view of an aircraft galley comprising a trolley stowage, wherein the trolley stowage is in a first operational state.
Figure 2:
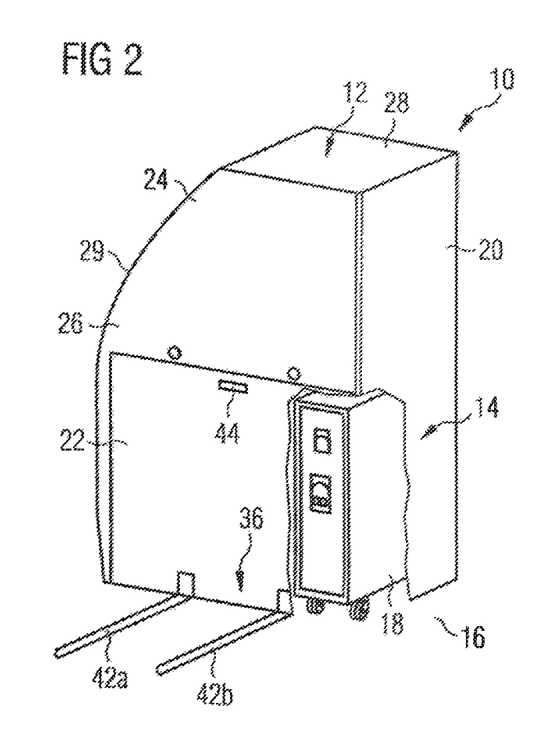
FIG. 2 shows a partially cut-out view of the aircraft galley depicted in FIG. 1.

In FIGS. 1 and 2, the trolley stowage 14 of the aircraft galley 10 is in a first operational state, wherein the trolley stowage 14 is adapted to accommodate four trolleys 18. In its first operational state, the trolley stowage 14 is delimited by a first side panel 20 of the main body 12, a first section 22 of a wall 24 of the main body 12, a separation panel (not shown in the drawings) extending within the main body 12 substantially parallel to the side panel 20 of the main body 12 at a distance corresponding to a width W of the first section 22 of the wall 24, and a further separation panel (not shown in the drawings) extending within the main body 12 substantially perpendicular to the side panel 20 of the main body 12. In the embodiment of an aircraft galley shown in FIGS. 1 to 4, the wall 24 is formed by a back wall of the main body 12.

Figure 3:
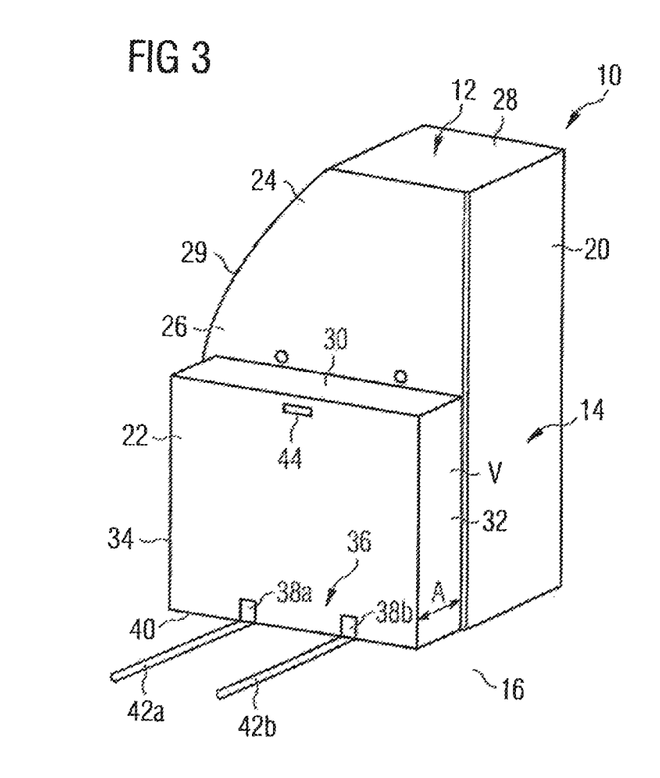
FIG. 3 shows the aircraft galley according to FIG. 1, wherein the trolley stowage is in a second operational state.
Figure 4:
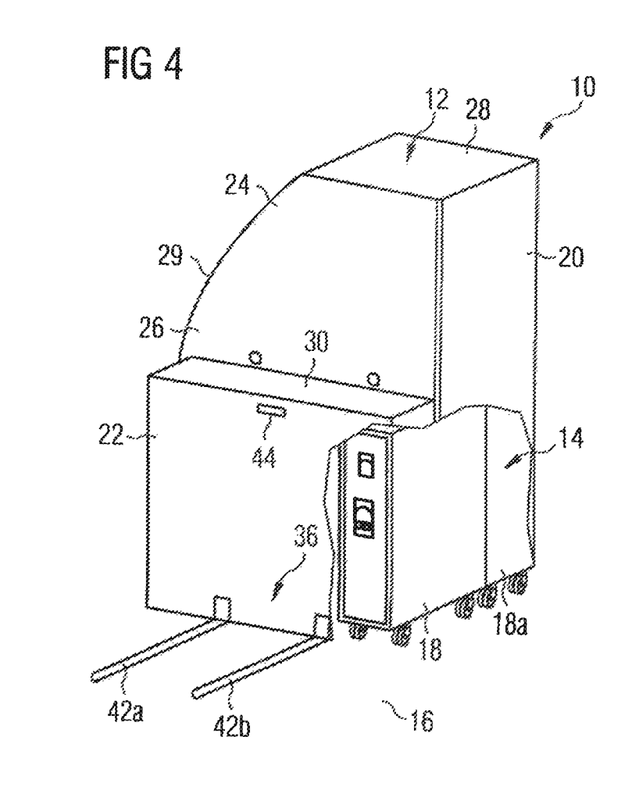
FIG. 4 shows a partially cut-out view of the aircraft galley depicted in FIG. 3.

As becomes apparent from a comparison of FIGS. 1 and 2 with FIGS. 3 and 4, the trolley stowage 14 of the aircraft galley 10 is convertible between the first operational state depicted in FIGS. 1 and 2 and a second operational state as shown in FIGS. 3 and 4. In its second operational state, the trolley stowage 14 has an additional volume V and hence is adapted to accommodate a number of trolleys which is larger than the numbers of trolleys which may be accommodated within the trolley stowage 14 is its first operational state. Specifically, in the aircraft galley 10 according to FIGS. 1 and 4, four full-size trolleys 18 and four half-size trolleys 18a may be accommodated within the trolley stowage 14, when the trolley stowage 14 is in its second operational state. The half-size trolleys 18a and the full-size trolley 18 may be arranged one behind the other in a direction of a depth D of the main body 12 of the aircraft galley 10, such that four pairs of trolleys 18, 18a, each comprising a full-size trolley 18 and a half-size trolley 18a, may be arranged in the trolley stowage 14 in its second operational state in a side-by-side arrangement.

When the trolley stowage 14 is in its first operational state, the first section 22 of the wall 24 extends coplanar to a second section 26 of the wall 24. The second section 26 of the wall 24 forms an upper part of the wall 24 adjacent to a cover plate 28 of the main body 12 and comprises a portion which laterally extends along an edge of the first section 22 adjacent to a second side panel 29 of the main body 12. When the trolley stowage 14 is in its first operational state, the first section 22 and the second section 26 of the wall 24 thus form a continuous rear surface of the main body 12. In the second operational state of the trolley stowage 14 the first section 22 of the wall 24, however, is arranged offset relative to the second section 26 of the wall 24, i.e., extends parallel to the second section 26 of the wall 24 at a distance A. The first section 22 of the wall 24, however, still provides for a rear boundary of the trolley stowage 14.

A top wall 30 is connected to the first section 22 of the wall 24. In the embodiment of an aircraft galley 10 according to FIGS. 1 to 4, the top wall 30 is fixedly attached to the first section 22 of the wall 24. When the trolley stowage 14 is in its first operational state, the top wall 30 is accommodated within the main body 12 and extends substantially parallel to the cover plate 28 of the main body 12 and parallel to and below the further separation panel which, in the first operational state of the trolley stowage 14, provides for an upper limitation of the trolley stowage 14. In the second operational state of the trolley stowage 14, the top wall 30 provides for an upper limitation of the additional volume V of the trolley stowage 14, i.e., covers the trolleys 18, 18a, accommodated within the additional volume V of the trolley stowage 14.

The top wall 30 extends substantially perpendicular to the first and the second sections 22, 26 of the wall 24. Hence, an upper surface of the top wall 30 may be used for different stowage purposes, e.g., may be used as a coat rack or a magazine rack, or may form an additional working surface which may be used by cabin crew members, e.g., for preparing drinks or meals.

Further, two sidewalls 32, 34 are connected to the first section 22 of the wall 24. In the embodiment of an aircraft galley 10 depicted in FIGS. 1 to 4, the sidewalls 32, 34 are fixedly attached to the first section 22 of the wall 24. When the trolley stowage 14 is in its first operational state, the sidewalls 32, 34 are accommodated within the main body 12 of the aircraft galley 10, wherein sidewall 32 extends parallel and adjacent to the side panel 20 of the main body 12, and wherein sidewall 34 extends parallel and adjacent to the separation panel extending within the main body 12 and providing for a lateral limitation of the trolley stowage 14 in the first operational state of the trolley stowage 14.

In the second operational state of the trolley stowage 14, the sidewalls 32, 34 provide for a lateral limitation of the additional volume V of the trolley stowage 14. Further, the sidewalls 32, 34 extend substantially perpendicular to the first section 22 to the wall 24 and the top wall 30 and thus, together with the first section 22 of the wall 24 and the top wall 30 define a cuboid-shaped additional volume V of the trolley stowage 14 which is in particular suitable to accommodate trolleys 18, 18a.

The aircraft galley 10 further comprises a latching mechanism 36 which serves to latch the trolley stowage 14 in either the first or the second operational state. Specifically, the latching mechanism 36 comprises two latching elements 38a, 38b which are arranged in the region of an edge 40 of the first section 22 of the wall 24, the edge 40 facing the floor 16 of the aircraft cabin. Each latching element 38a, 38b is adapted to interact with a seat rail 42a, 42b mounted in the floor 16 of the aircraft cabin. In particular, by the interaction of the latching elements 38a, 38b with the seat rails 42a, 42b, the first section 22 of the wall 24 and hence the trolley stowage 14 may be latched in different positions, i.e., the first section 22 of the wall 24 may be latched at different distances A from the second section 26 of the wall 24. Consequently, the size of the additional volume V of the trolley stowage 14 may be adapted in a particularly flexible manner to the space requirement for accommodating trolleys 18, 18a on board the aircraft.

Finally, a handle 44 is arranged on an outer surface of the first section 22 of the wall 24. As will be described in more detail below, the handle 44 may be gripped by a user upon converting the trolley stowage 14 between the first and the second operational state.

FIGS. 5 to 9 show an alternative embodiment of an aircraft galley 10 which differs from the galley according to FIGS. 1 to 4 in that the sidewalls 32, 34 of the trolley stowage 14 are no longer fixedly attached to the first section 22 of the wall 24, but pivotably connected to the first section 22 of the wall 24. Further, each sidewall 32, 34 comprises a first portion 32a, 34a and a second portion 32b, 34b, wherein the second portion 32b, 34b is pivotably connected to the first portion 32a, 34a.

Figure 5:
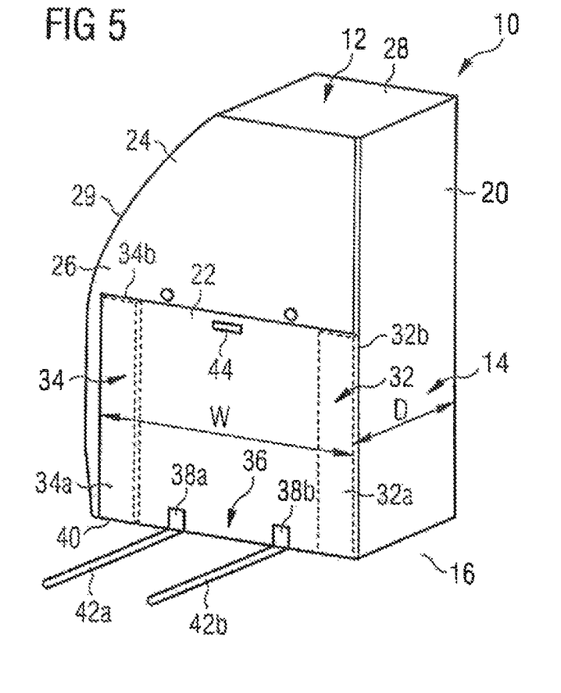
FIG. 5 shows a three dimensional view of a further aircraft galley comprising a trolley stowage, wherein the trolley stowage is in a first operational state.
Figure 6:
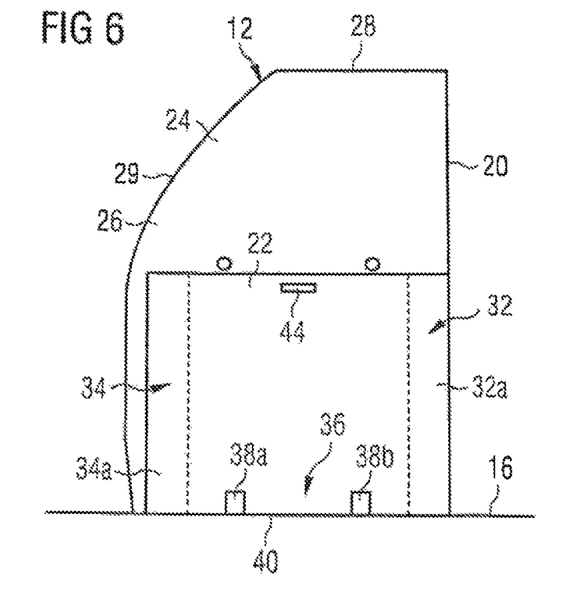
FIG. 6 shows a backside view of the aircraft galley depicted in FIG. 5.
Figure 7:
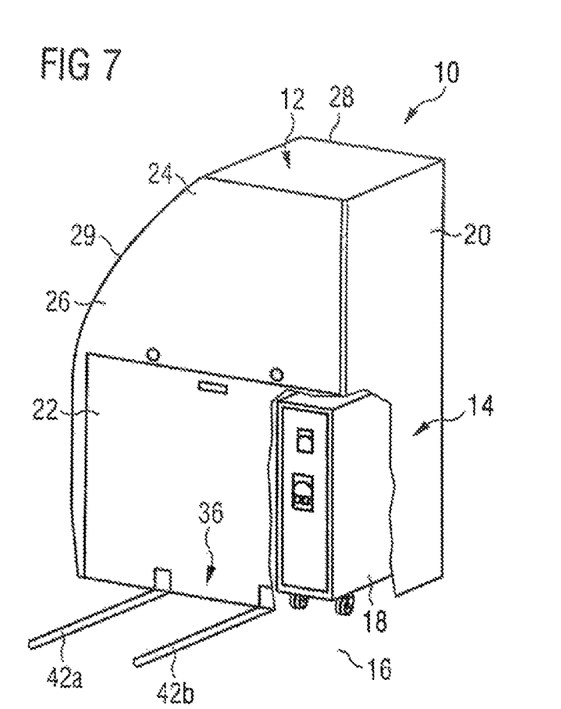
FIG. 7 shows a partially cut-out view of the aircraft galley depicted in FIG. 5.

As depicted in FIGS. 5 and 6, in the first operational state of the trolley stowage 14, the sidewalls 32, 34 may be accommodated within the main body 12 adjacent and parallel to the first section 22 of the wall 24, wherein the first and the second portion 32a, 34a, 32b, 34b of each sidewall 32, 34 are disposed parallel and adjacent to each other. When the trolley stowage 14 is in its first operational state, the sidewalls 32, 34 thus provide for an additional backing of the trolley stowage 14.

Figure 8:
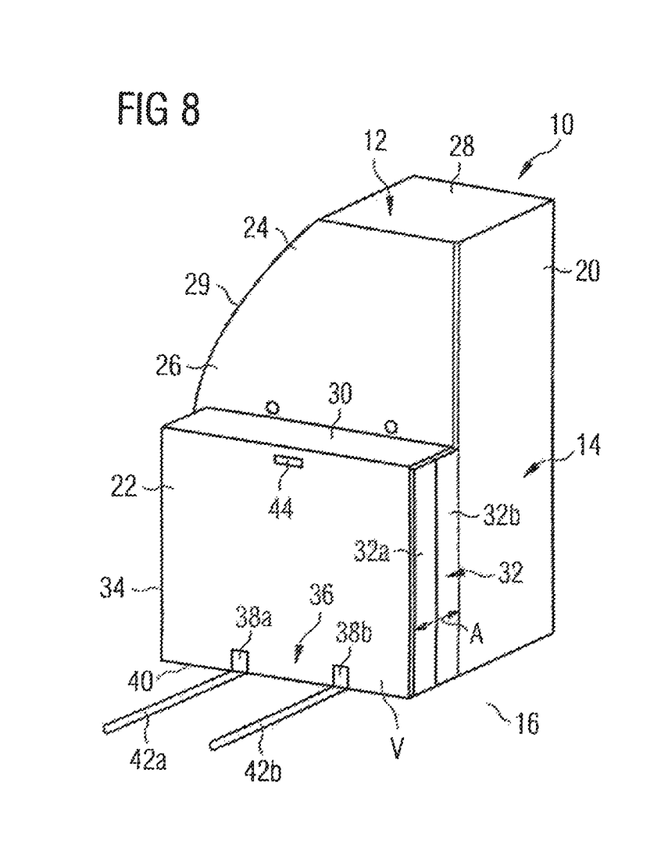
FIG. 8 shows a three dimensional view of the aircraft galley according to FIG. 5, herein the trolley stowage is in a second operational state.
Figure 9:
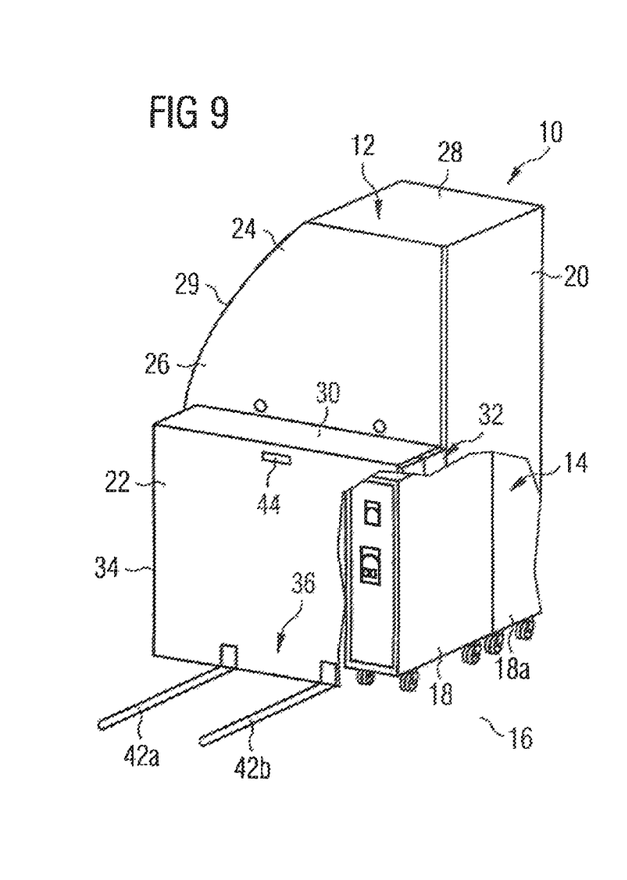
FIG. 9 shows a partially cut-out view of the aircraft galley depicted in FIG. 8, FIGS. 10A to 10D show a first method of operating an aircraft galley according to FIGS. 1 to 4 and FIGS. 11A to 11D show a second method of operating an aircraft galley according to FIGS. 1 to 4.
Figure 10A:
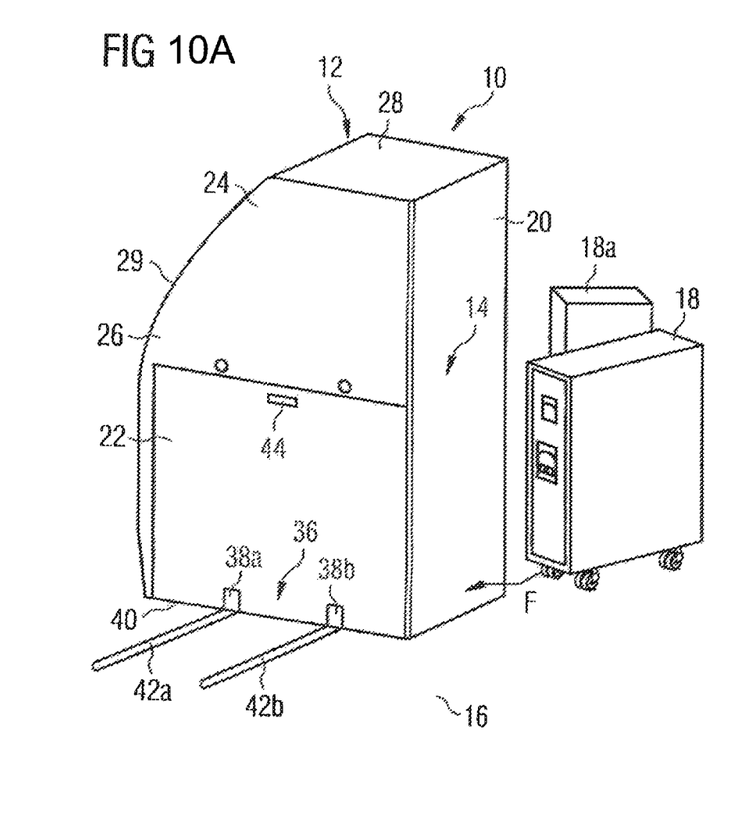
Figure 10B:
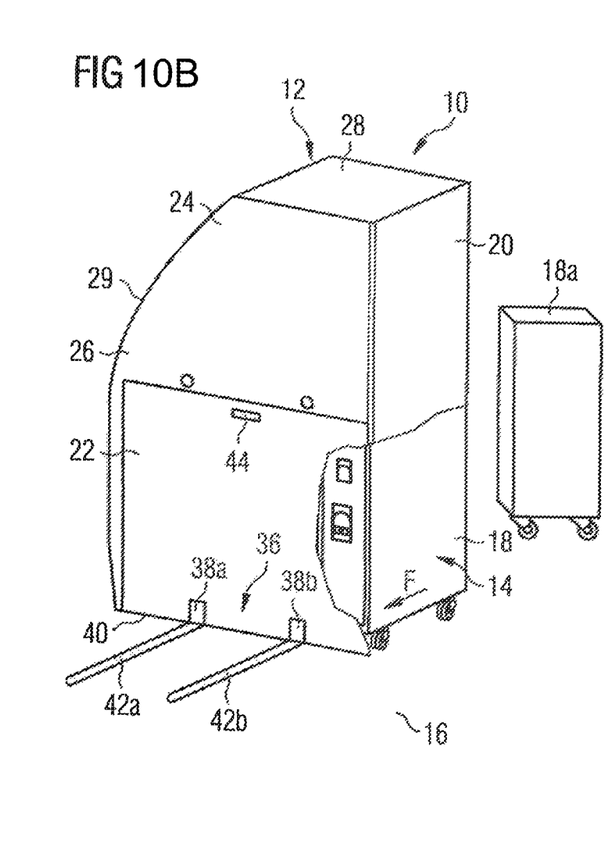
Figure 10C:
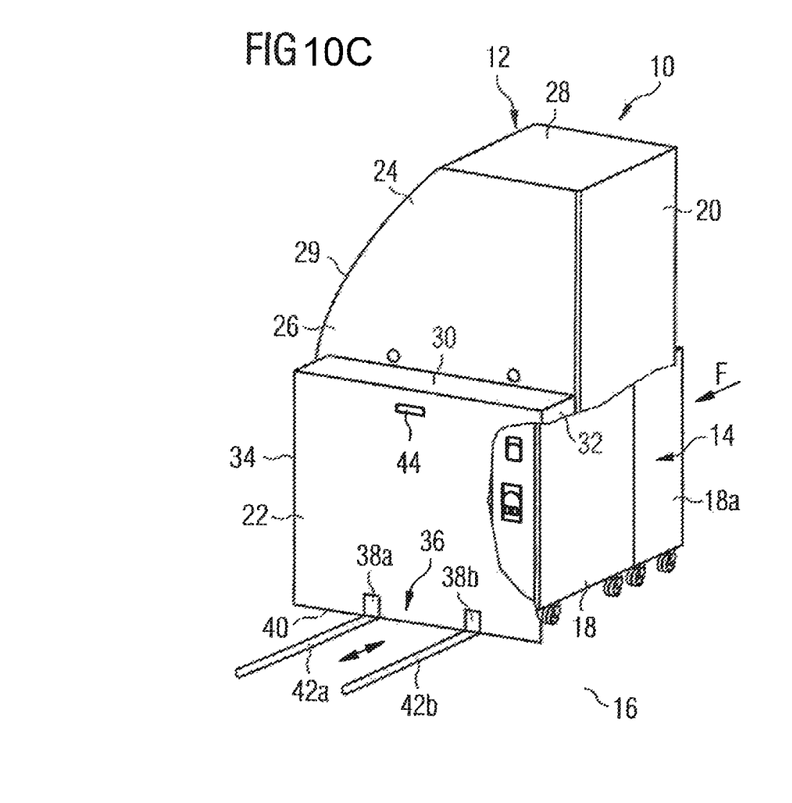
Figure 10D:
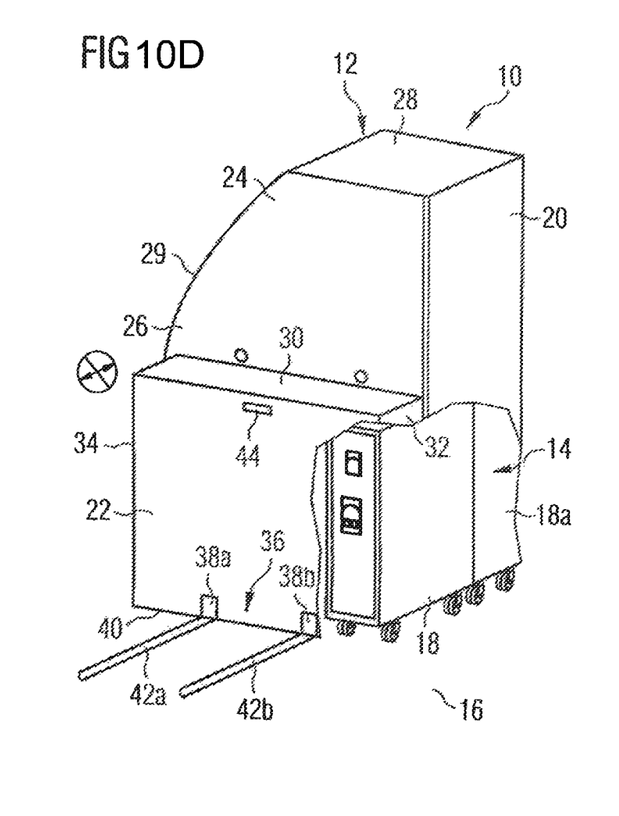
Figure 11A:
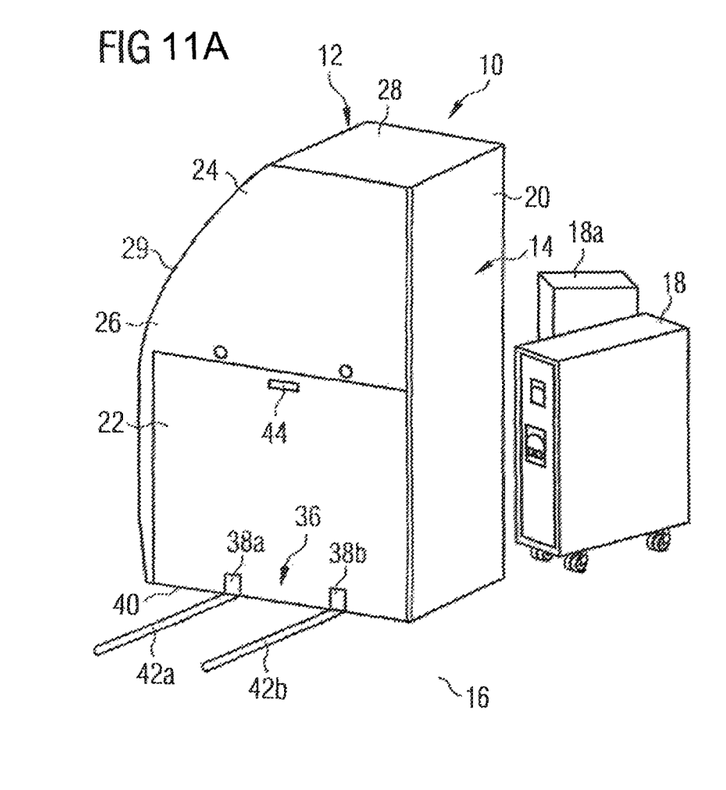
Figure 11B:
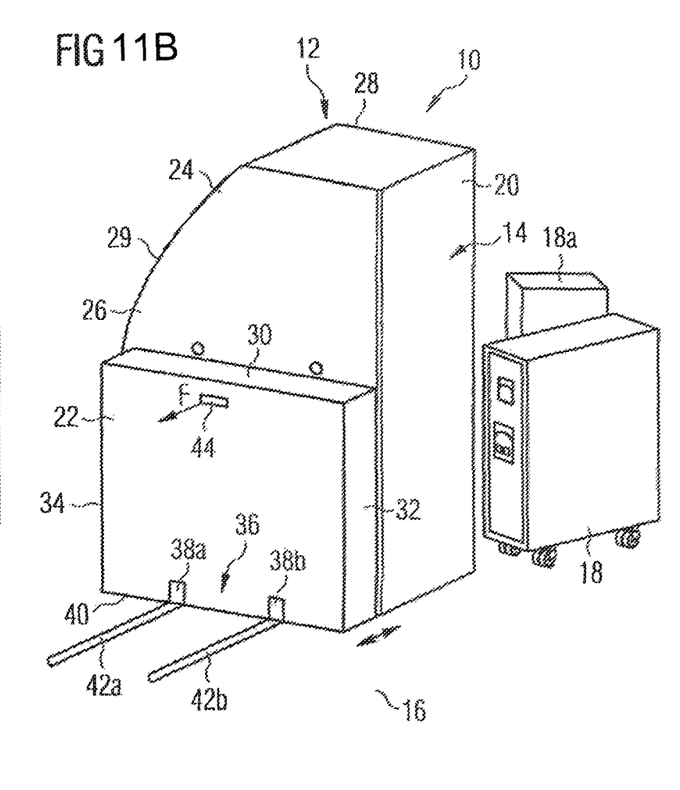
Figure 11C:
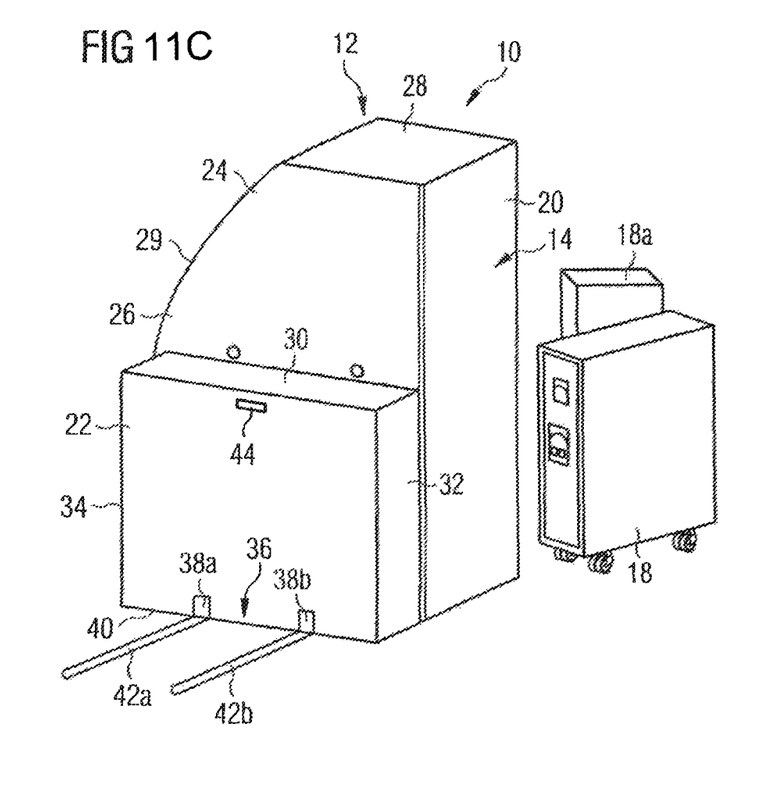
Figure 11D:
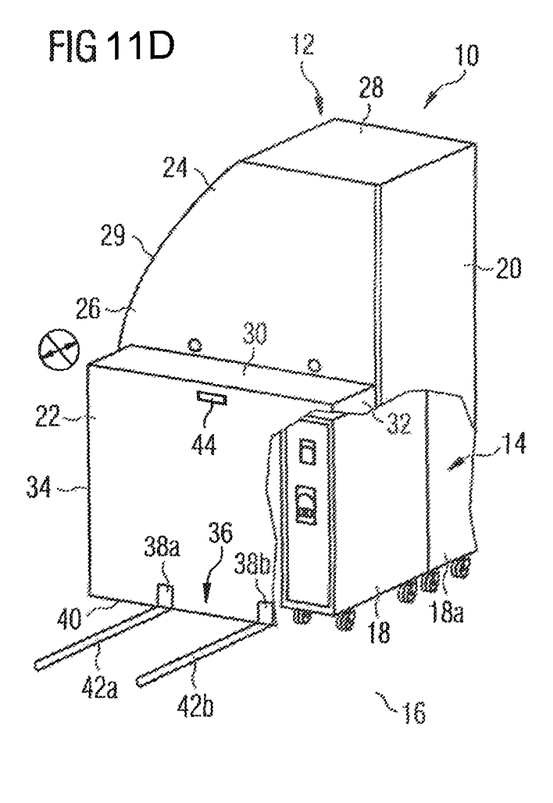

In the second operational state of the trolley stowage 14, the sidewalls 32, 34, however, extend substantially perpendicular to the first section 22 of the wall 24 and the top wall 30 and provide for a lateral limitation of the additional volume V of the trolley stowage, see FIGS. 8 and 9. Otherwise, the structure and the function of the aircraft galley 10 according to FIGS. 5 to 9 correspond to the structure on the functional the aircraft galley 10 depicted in FIGS. 1 to 4.

FIGS. 10A to 10D depict a first method of operating an aircraft galley according to FIGS. 1 to 4. As becomes apparent from the drawings, the trolley stowage 14 may be converted from its first operational state into its second operational state by first unlatching the latching mechanism 36 and then pushing a trolley 18 into the trolley stowage 14 until the trolley 18 abuts against an inner surface of the first section 22 of the wall 24. Thereafter, the trolley 18 is further pushed against the inner surface of the first section 22 of the wall 24 so as to displace the first section 22 of the wall 24 until the trolley stowage 14 is in its second operational state. The latching mechanism 36 then is again latched by bringing the latching elements 38a, 38b into engagement with the seat rails 42a, 42b. Finally, the additionally half-size trolleys 18a may be pushed into the now expanded trolley stowage 14.

An alternative method of operating an aircraft galley 10 is depicted in FIGS. 11A to 11D. After unlatching the latching mechanism 36, the trolley stowage 14 may be converted from its first operational state into its second operational state by the application of a manual pulling force to the outer surface of the first section 22 of the wall 24 so as to displace the first section 22 of the wall 24 until the trolley stowage 14 is in its second operational state. Specifically, a user may grip the handle 44 provided on the outer surface of the first section 22 of the wall 24 and pull the first section 22 of the wall 24 until the first section 22 of the wall 24 has reached the desired position at a desired distance A from the second section 26 of the wall 24. The latching mechanism 36 then again may be latched and the trolleys 18, 18a may be accommodated within the trolley stowage 14.

The trolley stowage 14 may be converted from its second operational state into its first operational state by manually applying a pushing force to the outer surface of the first section 22 of the wall 24. Further, upon operation of an aircraft galley depicted in FIGS. 5 to 9, converting the trolley stowage 14 from its first operational state into its second operational state may involve a pivoting of the sidewalls 32, 34 into the desired position depicted in FIGS. 8 and 9. Similarly, converting the trolley stowage 14 from its second operational state into its first operational state may involve pivoting the sidewalls 32, 34 into the position shown in FIGS. 5 and 6.

Moreover, it is conceivable to displace the first section 22 of the wall 24, upon converting the trolley stowage 14 from its first operational state into its second operational state, to an intermediate position, wherein the distance A between the first section 22 of the wall 24 and the second section 26 of the wall 24 is smaller than depicted in FIGS. 3, 4, 8, 9, 10c, 10d, 11c and 11d, resulting in a smaller additional volume V of the trolley stowage 14. In the aircraft galley according to FIGS. 1 to 4, the sidewalls 32, 34 then, in the second operational state of the trolley stowage 14, remain partially accommodated within the main body 12. In the aircraft galley according to FIGS. 4 to 9, the sidewalls 32, 34, in the second operational state of the trolley stowage 14, may be pivoted relative to the first section 22 of the wall 24 so as to arrange the sidewalls 32, 34 perpendicular relative to the first section 22 of the wall 24 and the top wall 30. The first and second portion 32a, 34a, 32b, 34b of each sidewall 32, 34, however, may remain in a folded state, i.e., even in the second operational state of the trolley stowage 14 may extend parallel and adjacent to each other.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft galley comprising:
a trolley stowage provided in a main body of the aircraft galley, the main body comprises a back wall including a first section and a second section that are parallel, the main body further comprising a front side that is opposite to and parallel to the back wall,
a first member of trolleys that comprises a plurality of trolleys that are received by the trolley stowage of the main body,
wherein the first section of the back wall delimits a rear boundary for a trolley stowage space containing the first number of trolleys, wherein the first section delimits the first number of trolleys, the rear boundary being opposite the front side of the main body, wherein the front side of the main body is configured such that trolleys can be pushed into the trolley stowage space through the front side of the main body,
the trolley stowage being convertible between a first operational state, wherein the trolley stowage is adapted to accommodate a first number of trolleys, and a second operational state, wherein the trolley stowage is adapted to accommodate a second number of trolleys, the second number of trolleys being greater than the first number of trolleys,
wherein the trolley stowage space is increased when the trolley stowage is converted from the first operational state to the second operational state,
wherein in all operational states the first section of the back wall is fixed in a position that is parallel to the second section of the back wall,
wherein in a first operational state, the first section and the second section of the back wall are coplanar, and in a second operational state, the first section is translated with respect to the main body but is parallel and horizontally offset from the second section forming a top wall surface that extends substantially perpendicular to at least one of the first section and the second section, the first section of the back wall being at all operational states static with respect to the top wall surface thereby forming a barrier to ingress of the plurality of trolleys from a direction exterior to and perpendicular to the first section of the wall, and in all operational states the second section of the back wall is static with respect to the main body and arranged vertically above the first section of the back wall, and
wherein the first section is a unitary surface across the main body that delimits the rear boundary of the trolley stowage as a continuous wall surface across each of the first number of trolleys of the trolley stowage space in both the first operational state and the second operational state.

2. The aircraft galley according to claim 1, wherein the top wall surface is connected to the first section of the back wall which, in the first operational state of the trolley stowage, is accommodated within the main body and which, in the second operational state of the trolley stowage, provides for an upper limitation of an additional volume of the trolley stowage.

3. The aircraft galley according to claim 1, wherein at least one side wall is connected to the first section of the back wall which, in the first operational state of the trolley stowage, is accommodated within the main body and which, in the second operational state of the trolley stowage, provides for a lateral limitation of the additional volume of the trolley stowage.

4. The aircraft galley according to claim 3, wherein the side wall, at least in the second operational state of the trolley stowage, extends at least one of substantially perpendicular to at least one of the first section of the back wall and the top wall surface, and substantially parallel to a side panel of the main body.

5. The aircraft galley according to claim 4, wherein the side wall, at least in the second operational state of the trolley stowage, extends coplanar to a side panel of the main body.

6. The aircraft galley according to claim 3, wherein the side wall is pivotably connected to the first section of the wall, such that the side wall, in the first operational state of the trolley stowage, is adapted to be accommodated within the main body adjacent and parallel to the first section of the wall.

7. The aircraft galley according to claim 3, wherein the side wall comprises a first portion and a second portion which is pivotably connected to the first portion, such that the second portion of the side wall, in the first operational state of the trolley stowage, is adapted to be accommodated within the main body adjacent and parallel to the first portion of the side wall.

8. The aircraft galley according to claim 1, wherein the latching mechanism comprises at least one latching element which is adapted to interact with a seat rail, the latching element being arranged in the region of an edge of the first section of the wall, the edge facing a floor of an aircraft cabin when the aircraft galley is mounted in the aircraft cabin.

9. The aircraft galley according to claim 1, further comprising a latching mechanism which is adapted to latch the trolley stowage in either the first or the second operational state.

10. The aircraft galley according to claim 1, further comprising a handle arranged on an outer surface of the first section of the wall.

11. The aircraft galley according to claim 1, wherein the rear boundary is disposed on a rear side of the aircraft galley, and
wherein the rear boundary permanently blocks trolleys from passing through the rear side.

12. A method of operating an aircraft galley according to claim 1, wherein the trolley stowage is converted from its first operational state into its second operational state by the application of a pulling force to the outer surface of the first section of the back wall so as to displace the first section of the back wall until the trolley stowage is in its second operational state.

13. A method of operating an aircraft galley comprising:
providing an aircraft galley which comprises
a trolley stowage provided in a main body of the aircraft galley, the main body comprises a back wall including a first section and a second section that are parallel, the main body further comprising a front side that is opposite to and parallel to the back wall,
a first number of trolleys that comprises a plurality of trolleys that are received by the trolley stowage of the main body,
wherein the first section of the back wall delimits a rear boundary for a trolley stowage space containing the first number of trolleys, wherein the first section delimits the first number of trolleys, the rear boundary being opposite the front side of the main body, wherein the front side of the main body is configured such that trolleys can be pushed into the trolley stowage space through the front side of the main body,
converting the trolley stowage between a first operational state, wherein the trolley stowage is adapted to accommodate the first number of trolleys, and a second operational state, wherein the trolley stowage is adapted to accommodate a second number of trolleys, the second number of trolleys being greater than the first number of trolleys,
wherein the first section delimits the rear boundary of the trolley stowage as a continuous wall surface across each of the first number of trolleys of the trolley stowage space in both the first operational state and the second operational state,
wherein the trolley stowage space is increased when the trolley stowage is converted form the first operational state to the second operational state,
wherein in all operational states the first section of the back wall is fixed in a position that is parallel to the second section of the back wall,
wherein in a first operational state, the first section and the second section of the back wall are coplanar, and in a second operational state, the first section is translated with respect to the main body but is parallel and horizontally offset from the second section forming a top wall surface that extends between and substantially perpendicular to at least one of the first section and the second section, the first section of the back wall being at all operational states static with respect to the top wall surface thereby forming a barrier to ingress of the plurality of trolleys from a direction exterior to an perpendicular to the first section of the wall, and in all operational states the second section of the back wall is static with respect to the main body and arranged vertically above the first section of the back wall, and
wherein the first section is a unitary surface across the main body that delimits the rear boundary of the trolley stowage as a continuous wall surface across each of the first number of trolleys of the trolley stowage space in both the first operational state and the second operational state,
wherein the trolley stowage is converted from its first operational state into its second operational state by pushing a trolley into the trolley stowage until the trolley abuts against an inner surface of the first section of the wall and by further pushing the trolley against the inner surface of the first section of the wall so as to displace the first section of the wall until the trolley stowage is in its second operational state.

14. The method according to claim 13, wherein the latching mechanism is unlatched prior to converting the trolley stowage from its first operational state into its second operational state, and wherein the latching mechanism is again latched when the trolley stowage is in its second operational state.

* * * * *